United States Patent
Deodhar et al.

(10) Patent No.: US 8,914,412 B2
(45) Date of Patent: Dec. 16, 2014

(54) DETERMINING FILE OWNERSHIP OF ACTIVE AND INACTIVE FILES BASED ON FILE ACCESS HISTORY

(75) Inventors: Neha Shirish Deodhar, Sunnyvale, CA (US); Jitendra Pore, Maharashtra (IN); Ketan Shah, San Jose, CA (US)

(73) Assignee: Symantec Corporation, Mountain View, CA (US)

( * ) Notice: Subject to any disclaimer, the term of this patent is extended or adjusted under 35 U.S.C. 154(b) by 447 days.

(21) Appl. No.: 13/082,206

(22) Filed: Apr. 7, 2011

(65) Prior Publication Data

US 2012/0259849 A1   Oct. 11, 2012

(51) Int. Cl.
  *G06F 17/30* (2006.01)
  *G06Q 10/10* (2012.01)
  *G06F 21/62* (2013.01)

(52) U.S. Cl.
  CPC .......... *G06Q 10/10* (2013.01); *G06F 17/30289* (2013.01); *G06F 21/6218* (2013.01)
  USPC ........... 707/783; 707/781; 707/782; 707/784; 707/785; 707/786; 707/787; 707/788; 365/202

(58) Field of Classification Search
  CPC ............................................... G06F 2221/2141
  USPC ................... 707/781–788, 999.009; 365/202
  See application file for complete search history.

(56) References Cited

U.S. PATENT DOCUMENTS

| 2005/0060333 | A1* | 3/2005 | Katsurabayashi et al. ..... 707/101 |
| 2007/0266058 | A1* | 11/2007 | Walsh et al. .................. 707/203 |
| 2008/0086683 | A1* | 4/2008 | Rich et al. .................... 715/239 |

FOREIGN PATENT DOCUMENTS

JP   2007011844 A  *  1/2007

* cited by examiner

*Primary Examiner* — Syling Yen
(74) *Attorney, Agent, or Firm* — Wilmer Cutler Pickering Hale and Dorr LLP

(57) ABSTRACT

File management systems and methods are presented. In one embodiment, implementation of a method for determining the accurate ownership of a file within a data system includes: identifying a first plurality of access events for a file, wherein the file is associated with a directory of related files; identifying a second plurality of access events for the related files within the directory, wherein access events in the first and second plurality of access events occur within a period; determining a pool of users accessing files within the directory within the period; and selecting a user from the pool of users as an inferred owner of the file based on access metrics related to the plurality of access events.

20 Claims, 13 Drawing Sheets

| SISTER FILES BY TYPE | INFERRED OWNER |
|---|---|
| MEDIA | USER "B" |
| DOCUMENT/TEXT | USER "A" |
| IMAGES | USER "B" |

| UNKNOWN OWNER FILES BY TYPE | INFERRED OWNER |
|---|---|
| foo1.txt | USER "A" |
| foo2.jpg | USER "B" |
| foo3.avi | USER "B" |

| SISTER TEXT FILES BY CONTENT (905) | INFERRED OWNER (910) |
|---|---|
| FINANCIAL | USER "B" |
| SOURCE CODE | USER "A" |
| HUMAN RESOURCES | USER "C" |

| UNKNOWN OWNER FILES BY TYPE/CONTENT (955) | INFERRED OWNER (960) |
|---|---|
| foo.txt (SOURCE) | USER "A" |

DETERMINING FILE OWNERSHIP OF ACTIVE AND INACTIVE FILES BASED ON FILE ACCESS HISTORY

BACKGROUND

The management of data is important. For instance, management of unstructured data containing files that have limited relationships to other data, such as documents, email, reports, letters, research notes, presentations, and intellectual property documents represent about 80% of all data. This file data may spread among many systems and departments and migrate between systems as a data storage infrastructure grows. As a result of data migrations or consolidation of data, many files are labeled as being owned by "administrators," which makes it difficult to establish who in an enterprise actually owns the data.

Identifying data ownership is critical for a number of information technology initiatives, and lack of data owner identification can become a barrier to large scale data remediation and management. For instance, ownership of a file is important for control and maintenance purposes. Each file has an owner, which may correspond to a user name defined in a computing system. Ownership of a file is useful for showing who edited the file, and also for providing control mechanisms determining who can access the file depending on access permissions. In addition, accurate ownership of a file is important for determining how a file should be maintained, such as when implementing deletion and archiving policies. Further, accurate ownership provides for proper billing for services associated with the file.

Conventional methods do not provide an accurate picture of the ownership of a file, thereby leading to poor access control of a file. For instance, previous systems rely on using Windows File Security application programming interfaces (APIs). In particular, a conventional system may use "Created By" information to discover ownership of a file. However, the information provided in these APIs and specifically in the "Created By" field is insufficient for fully defining ownership of a file, and may possibly provide inaccurate ownership information.

Further, ownership of a file may change over time, and these changes are not reflected in the "Created By" field. In a typical use case, username-1 creates a file for use in a particular project-1. Six months later username-1 is transferred to another project-2 and no longer is working on project-1. As such, username-1 no longer has need to access the file, but other users still working on project-1 will continue to access the file. In this case, while username-1 created the file and is still considered the owner, he or she no longer is intimately associated with the file and cannot provide current access control over the file.

In one specific case, improper ownership may lead to unauthorized access of a file, as access permissions of an outdated and improper owner of a file are employed, and may provide access to the file by previously authorized, but currently unauthorized users. As such, instead of implementing access permissions of the current and proper owner of a file, access permissions of an outdated and improper owner of a file are employed, and may provide access to the file by unauthorized users. This may result in improper archiving of a file by an unauthorized user of the file, and also may result in improper deletion of an important file by an unauthorized user.

SUMMARY

File management systems and methods of determining accurate ownership of a file in a data system are presented. In one embodiment, computer implementation of a method for file management includes: identifying a first plurality of access events for a file, wherein the file is associated with a directory of related files; identifying a second plurality of access events for the related files within the directory, wherein access events in the first and second plurality of access events occur within a period; determining a pool of users accessing files within the directory within the period; and selecting a user from the pool of users as an inferred owner of the file based on access metrics related to the plurality of access events.

In one embodiment, selection of a user is directed towards active files, in which the computer implemented method comprises: determining the file is an active file; limiting relevant access events to the first plurality of access events; filtering the pool of users to users accessing the file; and selecting the user as the inferred user having the most accesses of the file within the period. In another embodiment, selection of a user is directed towards inactive files, in which the computer implemented method comprises: determining the file is an inactive file; determining one or more related files that are active; for each related file, determining a corresponding inferred owner having the most accesses, wherein a pool of related owners comprises one or more corresponding inferred owners of the related files; and selecting the user from the pool of related owners having the most accesses of the active and related files.

In some embodiments, the computer implemented method examines file type to determine ownership of an inactive file, and comprises: determining a file type for the file; and filtering related files by the file type, wherein the pool of related owners comprises one or more corresponding inferred owners of related files comprising the file type. That is, for an inactive file of a particular file type, the user who has the most accesses of related files with the same file type is considered to be the inferred owner. In other embodiments, the computer implemented method examines file content to determine ownership of an inactive file, and comprises: determining a file type for the file; determining a content grouping for the file, wherein the content grouping is associated with the file type; and filtering the related files by the content grouping and the file type, wherein the pool of related owners comprises one or more corresponding inferred owners of related files comprising the file type and the content grouping. That is, for an inactive file of a particular content grouping of a file type, the user who has the most accesses of related files with the same content grouping and file type is considered to be the inferred owner.

In some embodiments, the computer implemented method manages access to a file by determining proper ownership permissions, and comprises: scanning a file for sensitive information; determining whether the file is a secure file configured to store sensitive information; determining proper ownership of a file and its corresponding access permissions; determining whether the requesting user has permission to access the file; allowing or denying access to the file depending on the access permissions; and notifying the inferred owner of the file of a denial or improper storage of sensitive information.

In one embodiment, a system includes a tangible, non-transitory computer-readable storage medium having stored thereon, computer-executable instructions that, when executed causes the computer system to perform a method for file management, comprising: identifying a first plurality of access events for a file, wherein the file is associated with a directory of related files; identifying a second plurality of access events for the related files within the directory, wherein access events in the first and second plurality of access events occur within a period; determining a pool of users accessing files within the directory within the period; and selecting a user from the pool of users as an inferred owner of the file based on access metrics related to the plurality of access events. In one embodiment, the selection phase is directed towards active files, in which the computer executable instructions comprise: determining the file is an active file; limiting relevant access events to the first plurality of access events related to accesses of the file; filtering the pool of users to users accessing the file; and selecting the user as the inferred user having the most accesses of the file within the period. In another embodiment, the selection phase is directed towards inactive files, in which the computer executable instructions comprise: determining the file is an inactive file; determining one or more related files that are active; for each related file, determining a corresponding inferred owner having the most accesses, wherein a pool of related owners comprises one or more corresponding inferred owners of related files; and selecting the user from the pool of related owners having the most accesses of the related files.

In some embodiments, the computer executable instructions cause the computer system to examine file type to determine ownership of an inactive file, and comprises: determining a file type for the file; and filtering related files by the file type, wherein the pool of related owners comprises one or more corresponding inferred owners of related files comprising the file type. That is, for an inactive file of a particular file type, the user who has the most accesses of related files with the same file type is considered to be the inferred owner. In other embodiments, the computer executable instructions cause the system to examine file content to determine ownership of an inactive file, and comprises: determining a file type for the file; determining a content grouping for the file, wherein the content grouping is associated with the file type; and filtering the related files by the content grouping and the file type, wherein the pool of related owners comprises one or more corresponding inferred owners of related files comprising the file type and the content grouping. That is, for an inactive file of a particular content grouping of a file type, the user who has the most accesses of related files with the same content grouping and file type is considered to be the inferred owner.

In some embodiments, the computer executable instructions cause the computer system to manage access to a file by determining proper ownership permissions, and comprises: scanning a file for sensitive information; determining whether the file is a secure file configured to store sensitive information; determine proper ownership of a file and its corresponding access permissions; determining whether the requesting user has access permission to the file; allowing or denying access to the file depending on the access permissions; and notifying the inferred owner of the file of a denial or improper storage of sensitive information.

In one embodiment, a computer system comprises a processor coupled to memory having stored therein instructions that, if executed by the computer system, cause the computer to execute a method for file management, comprising: identifying a first plurality of access events for a file, wherein the file is associated with a directory of related files; identifying a second plurality of access events for the related files within the directory, wherein access events in the first and second plurality of access events occur within a period; determining a pool of users accessing files within the directory within the period; and selecting a user from the pool of users as an inferred owner of the file based on access metrics related to the plurality of access events. In one embodiment, the selection phase is directed towards active files, in which the computer system executes a method comprising: determining the file is an active file; limiting relevant access events to the first plurality of access events related to accesses of the file; filtering the pool of users to users accessing the file; and selecting the user as the inferred user having the most accesses of the file within the period. In another embodiment, selection phase directed towards inactive files, in which the computer system executes a method comprising: determining the file is an inactive file; determining one or more related files that are active; for each related file, determining a corresponding inferred owner having the most accesses, wherein a pool of related owners comprises one or more corresponding inferred owners of related files; and selecting the user from the pool of related owners having the most accesses of the related files.

In some embodiments, the computer system executing the method examines file type to determine ownership of an inactive file, and comprises: determining a file type for the file; and filtering related files by the file type, wherein the pool of related owners comprises one or more corresponding inferred owners of related files comprising the file type. That is, for an inactive file of a particular file type, the user who has the most accesses of related files with the same file type is considered to be the inferred owner. In other embodiments, the computer system executing the method examines file content to determine ownership of an inactive file, and comprises: determining a file type for the file; determining a content grouping for the file, wherein the content grouping is associated with the file type; and filtering the related files by the content grouping and the file type, wherein the pool of related owners comprises one or more corresponding inferred owners of related files comprising the file type and the content grouping. That is, for an inactive file of a particular content grouping of a file type, the user who has the most accesses of related files with the same content grouping and file type is considered to be the inferred owner.

In some embodiments, the computer system executing the method manages access to a file by determining proper ownership permissions, and comprises: scanning a file for sensitive information; determining whether the file is a secure file configured to store sensitive information; determine proper ownership of a file and its corresponding access permissions; determining whether the requesting user has permission to access the file; allowing or denying access to the file depending on the access permissions; and notifying the inferred owner of the file of a denial or improper storage of sensitive information.

Thus, according to embodiments of the present disclosure, determination of accurate file ownership is performed by examining access history for active files, and examining access patterns of related files, including sibling and/or parent files, for inactive files. As such, methods and systems for file management in which accurate file ownership is determined are disclosed.

These and other objects and advantages of the various embodiments of the present disclosure will be recognized by those of ordinary skill in the art after reading the following detailed description of the embodiments that are illustrated in the various drawing figures.

BRIEF DESCRIPTION OF THE DRAWINGS

The accompanying drawings, which are incorporated in and form a part of this specification and in which like numerals depict like elements, illustrate embodiments of the present disclosure and, together with the description, serve to explain the principles of the disclosure.

FIGS. 8A and 8B are tables showing the classification of related files by file type, and the inference of ownership of a file associated with a file type by access patterns of related files having the same file type in accordance with one embodiment of the present disclosure.

FIGS. 9A and 9B are tables showing the classification of related files by file type and content grouping, and the inference of ownership of a file associated with a file type and content grouping by access patterns of related files having the same file type and content grouping in accordance with one embodiment of the present invention.

DETAILED DESCRIPTION

Figure 1:
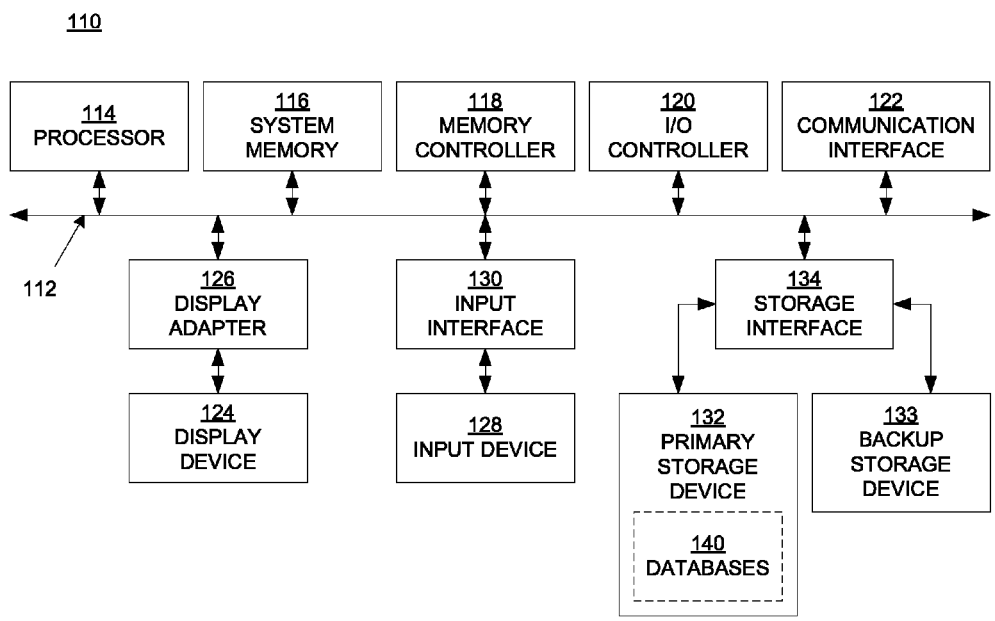
FIG. 1 is a block diagram depicting a network architecture in accordance with one embodiment of the present disclosure.

Reference will now be made in detail to the various embodiments of the present disclosure, examples of which are illustrated in the accompanying drawings. While described in conjunction with these embodiments, it will be understood that they are not intended to limit the disclosure to these embodiments. On the contrary, the disclosure is intended to cover alternatives, modifications and equivalents, which may be included within the spirit and scope of the disclosure as defined by the appended claims. Furthermore, in the following detailed description of the present disclosure, numerous specific details are set forth in order to provide a thorough understanding of the present disclosure. However, it will be understood that the present disclosure may be practiced without these specific details. In other instances, well-known methods, procedures, components, and circuits have not been described in detail so as not to unnecessarily obscure aspects of the present disclosure.

Some portions of the detailed descriptions that follow are presented in terms of procedures, logic blocks, processing, and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those utilizing physical manipulations of physical quantities. Usually, although not necessarily, these quantities take the form of electrical or magnetic signals capable of being stored, transferred, combined, compared, and otherwise manipulated in a computer system. It has proven convenient at times, principally for reasons of common usage, to refer to these signals as transactions, bits, values, elements, symbols, characters, samples, pixels, or the like.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present disclosure, discussions utilizing terms such as "determining," "identifying," "selecting," "storing," "limiting," "filtering," or the like, refer to actions and processes (e.g., flowcharts 500, 600A, 600B, and 1000 of FIGS. 5, 6A, 6B, and 10 respectively) of a computer system or similar electronic computing device or processor (e.g., system 110 of FIG. 1). The computer system or similar electronic computing device manipulates and transforms data represented as physical (electronic) quantities within the computer system memories, registers or other such information storage, transmission or display devices.

Embodiments described herein may be discussed in the general context of computer-executable instructions residing on some form of computer-readable storage medium, such as program modules, executed by one or more computers or other devices. By way of example, and not limitation, computer-readable storage media may comprise non-transitory computer storage media and communication media. Generally, program modules include routines, programs, objects, components, data structures, etc., that perform particular tasks or implement particular abstract data types. The functionality of the program modules may be combined or distributed as desired in various embodiments.

Computer storage media includes volatile and nonvolatile, removable and non-removable media implemented in any method or technology for storage of information such as computer-readable instructions, data structures, program modules or other data. Computer storage media includes, but is not limited to, random access memory (RAM), read only memory (ROM), electrically erasable programmable ROM (EEPROM), flash memory or other memory technology, compact disk ROM (CD-ROM), digital versatile disks (DVDs) or other optical storage, magnetic cassettes, magnetic tape, magnetic disk storage or other magnetic storage devices, or any other medium that can be used to store the desired information and that can accessed to retrieve that information.

Communication media can embody computer-executable instructions, data structures, and program modules, and includes any information delivery media. By way of example, and not limitation, communication media includes wired media such as a wired network or direct-wired connection, and wireless media such as acoustic, radio frequency (RF), infrared and other wireless media. Combinations of any of the above can also be included within the scope of computer-readable media.

FIG. 1 is a block diagram of an example of a computing system 110 capable of implementing embodiments of the present disclosure. Computing system 110 broadly represents any single or multi-processor computing device or system capable of executing computer-readable instructions. Examples of computing system 110 include, without limitation, workstations, laptops, client-side terminals, servers, distributed computing systems, handheld devices, or any other computing system or device. In its most basic configuration, computing system 110 may include at least one processor 114 and a system memory 116.

Processor 114 generally represents any type or form of processing unit capable of processing data or interpreting and executing instructions. In certain embodiments, processor 114 may receive instructions from a software application or module. These instructions may cause processor 114 to perform the functions of one or more of the example embodiments described and/or illustrated herein. For example, processor 114 may perform and/or be a means for performing, either alone or in combination with other elements, one or more of the identifying, determining, using, implementing, translating, tracking, receiving, moving, and providing described herein. Processor 114 may also perform and/or be a means for performing any other steps, methods, or processes described and/or illustrated herein.

System memory 116 generally represents any type or form of volatile or non-volatile storage device or medium capable of storing data and/or other computer-readable instructions. Examples of system memory 116 include, without limitation, RAM, ROM, flash memory, or any other suitable memory device. Although not required, in certain embodiments computing system 110 may include both a volatile memory unit (such as, for example, system memory 116) and a non-volatile storage device (such as, for example, primary storage device 132).

Computing system 110 may also include one or more components or elements in addition to processor 114 and system memory 116. For example, in the embodiment of FIG. 1, computing system 110 includes a memory controller 118, an input/output (I/O) controller 120, and a communication interface 122, each of which may be interconnected via a communication infrastructure 112. Communication infrastructure 112 generally represents any type or form of infrastructure capable of facilitating communication between one or more components of a computing device. Examples of communication infrastructure 112 include, without limitation, a communication bus (such as an Industry Standard Architecture (ISA), Peripheral Component Interconnect (PCI), PCI Express (PCIe), or similar bus) and a network.

Memory controller 118 generally represents any type or form of device capable of handling memory or data or controlling communication between one or more components of computing system 110. For example, memory controller 118 may control communication between processor 114, system memory 116, and I/O controller 120 via communication infrastructure 112. Memory controller may perform and/or be a means for performing, either alone or in combination with other elements, one or more of the operations or features described herein.

I/O controller 120 generally represents any type or form of module capable of coordinating and/or controlling the input and output functions of a computing device. For example, I/O controller 120 may control or facilitate transfer of data between one or more elements of computing system 110, such as processor 114, system memory 116, communication interface 122, display adapter 126, input interface 130, and storage interface 134. I/O controller 120 may be used, for example, to perform and/or be a means for performing, either alone or in combination with other elements, one or more of the operations described herein. I/O controller 120 may also be used to perform and/or be a means for performing other operations and features set forth in the instant disclosure.

Communication interface 122 broadly represents any type or form of communication device or adapter capable of facilitating communication between example computing system 110 and one or more additional devices. For example, communication interface 122 may facilitate communication between computing system 110 and a private or public network including additional computing systems. Examples of communication interface 122 include, without limitation, a wired network interface (such as a network interface card), a wireless network interface (such as a wireless network interface card), a modem, and any other suitable interface. In one embodiment, communication interface 122 provides a direct connection to a remote server via a direct link to a network, such as the Internet. Communication interface 122 may also indirectly provide such a connection through, for example, a local area network (such as an Ethernet network), a personal area network, a telephone or cable network, a cellular telephone connection, a satellite data connection, or any other suitable connection.

Communication interface 122 may also represent a host adapter configured to facilitate communication between computing system 110 and one or more additional network or storage devices via an external bus or communications channel. Examples of host adapters include, without limitation, Small Computer System Interface (SCSI) host adapters, Universal Serial Bus (USB) host adapters, IEEE (Institute of Electrical and Electronics Engineers) 1394 host adapters, Serial Advanced Technology Attachment (SATA) and External SATA (eSATA) host adapters, Advanced Technology Attachment (ATA) and Parallel ATA (PATA) host adapters, Fibre Channel interface adapters, Ethernet adapters, or the like. Communication interface 122 may also allow computing system 110 to engage in distributed or remote computing. For example, communication interface 122 may receive instructions from a remote device or send instructions to a remote device for execution. Communication interface 122 may perform and/or be a means for performing, either alone or in combination with other elements, one or more of the operations disclosed herein. Communication interface 122 may also be used to perform and/or be a means for performing other operations and features set forth in the instant disclosure.

As illustrated in FIG. 1, computing system 110 may also include at least one display device 124 coupled to communication infrastructure 112 via a display adapter 126. Display device 124 generally represents any type or form of device capable of visually displaying information forwarded by display adapter 126. Similarly, display adapter 126 generally represents any type or form of device configured to forward graphics, text, and other data from communication infrastructure 112 (or from a frame buffer, as known in the art) for display on display device 124.

As illustrated in FIG. 1, computing system 110 may also include at least one input device 128 coupled to communication infrastructure 112 via an input interface 130. Input device 128 generally represents any type or form of input device capable of providing input, either computer- or human-generated, to computing system 110. Examples of input device 128 include, without limitation, a keyboard, a pointing device, a speech recognition device, or any other input device. In one embodiment, input device 128 may perform and/or be a means for performing, either alone or in combination with other elements, one or more of the operations disclosed herein. Input device 128 may also be used to perform and/or be a means for performing other operations and features set forth in the instant disclosure.

As illustrated in FIG. 1, computing system 110 may also include a primary storage device 132 and a backup storage device 133 coupled to communication infrastructure 112 via a storage interface 134. Storage devices 132 and 133 generally represent any type or form of storage device or medium capable of storing data and/or other computer-readable instructions. For example, storage devices 132 and 133 may be a magnetic disk drive (e.g., a so-called hard drive), a floppy disk drive, a magnetic tape drive, an optical disk drive, a flash drive, or the like. Storage interface 134 generally represents any type or form of interface or device for transferring data between storage devices 132 and 133 and other components of computing system 110.

In one example, databases 140 may be stored in primary storage device 132. Databases 140 may represent portions of a single database or computing device or a plurality of databases or computing devices. For example, databases 140 may represent (be stored on) a portion of computing system 110 and/or portions of example network architecture 200 in FIG. 2 (below). Alternatively, databases 140 may represent (be stored on) one or more physically separate devices capable of being accessed by a computing device, such as computing system 110 and/or portions of network architecture 200.

Continuing with reference to FIG. 1, storage devices 132 and 133 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 132 and 133 may also include other similar structures or devices for allowing computer software, data, or other computer-readable instructions to be loaded into computing system 110. For example, storage devices 132 and 133 may be configured to read and write software, data, or other computer-readable information. Storage devices 132 and 133 may also be a part of computing system 110 or may be separate devices accessed through other interface systems.

Storage devices 132 and 133 may be used to perform, and/or be a means for performing, either alone or in combination with other elements, one or more of the operations disclosed herein. Storage devices 132 and 133 may also be used to perform, and/or be a means for performing, other operations and features set forth in the instant disclosure.

Many other devices or subsystems may be connected to computing system 110. Conversely, all of the components and devices illustrated in FIG. 1 need not be present to practice the embodiments described herein. The devices and subsystems referenced above may also be interconnected in different ways from that shown in FIG. 1. Computing system 110 may also employ any number of software, firmware, and/or hardware configurations. For example, the example embodiments disclosed herein may be encoded as a computer program (also referred to as computer software, software applications, computer-readable instructions, or computer control logic) on a computer-readable medium.

The computer-readable medium containing the computer program may be loaded into computing system 110. All or a portion of the computer program stored on the computer-readable medium may then be stored in system memory 116 and/or various portions of storage devices 132 and 133. When executed by processor 114, a computer program loaded into computing system 110 may cause processor 114 to perform and/or be a means for performing the functions of the example embodiments described and/or illustrated herein. Additionally or alternatively, the example embodiments described and/or illustrated herein may be implemented in firmware and/or hardware. For example, computing system 110 may be configured as an application specific integrated circuit (ASIC) adapted to implement one or more of the embodiments disclosed herein.

Figure 2:
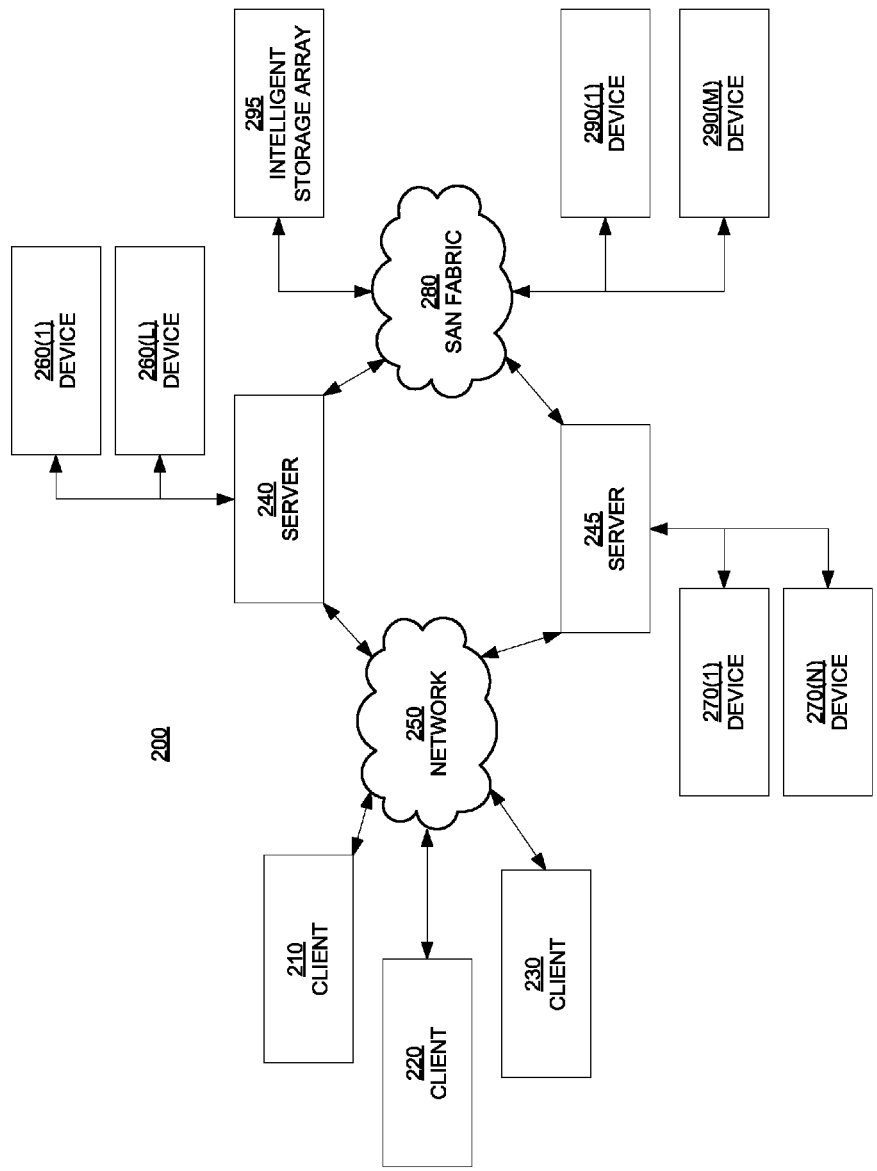
FIG. 2 depicts a block diagram of an exemplary computer system suitable for implementing the present methods in accordance with one embodiment of the present disclosure.

FIG. 2 is a block diagram of an example of a network architecture 200 in which client systems 210, 220, and 230 and servers 240 and 245 may be coupled to a network 250. Client systems 210, 220, and 230 generally represent any type or form of computing device or system, such as computing system 110 of FIG. 1.

Similarly, servers 240 and 245 generally represent computing devices or systems, such as application servers or database servers, configured to provide various database services and/or run certain software applications. Network 250 generally represents any telecommunication or computer network including, for example, an intranet, a wide area network (WAN), a local area network (LAN), a personal area network (PAN), or the Internet.

As illustrated in FIG. 2, one or more storage devices 260(1)-(L) may be directly attached to server 240. Similarly, one or more storage devices 270(1)-(N) may be directly attached to server 245. Storage devices 260(1)-(L) and storage devices 270(1)-(N) generally represent any type or form of storage device or medium capable of storing data and/or other computer-readable instructions. Storage devices 260(1)-(L) and storage devices 270(1)-(N) may represent network-attached storage (NAS) devices configured to communicate with servers 240 and 245 using various protocols, such as Network File System (NFS), Server Message Block (SMB), or Common Internet File System (CIFS).

Servers 240 and 245 may also be connected to a storage area network (SAN) fabric 280. SAN fabric 280 generally represents any type or form of computer network or architecture capable of facilitating communication between storage devices. SAN fabric 280 may facilitate communication between servers 240 and 245 and storage devices 290(1)-(M) and/or an intelligent storage array 295. SAN fabric 280 may also facilitate, via network 250 and servers 240 and 245, communication between client systems 210, 220, and 230 and storage devices 290(1)-(M) and/or intelligent storage array 295 in such a manner that devices 290(1)-(M) and array 295 appear as locally attached devices to client systems 210, 220, and 230. As with storage devices 260(1)-(L) and storage devices 270(1)-(N), storage devices 290(1)-(M) and intelligent storage array 295 generally represent any type or form of storage device or medium capable of storing data and/or other computer-readable instructions.

With reference to computing system 110 of FIG. 1, a communication interface, such as communication interface 122, may be used to provide connectivity between each client system 210, 220, and 230 and network 250. Client systems 210, 220, and 230 may be able to access information on server 240 or 245 using, for example, a Web browser or other client software. Such software may allow client systems 210, 220, and 230 to access data hosted by server 240, server 245, storage devices 260(1)-(L), storage devices 270(1)-(N), storage devices 290(1)-(M), or intelligent storage array 295. Although FIG. 2 depicts the use of a network (such as the Internet) for exchanging data, the embodiments described herein are not limited to the Internet or any particular network-based environment.

Returning to FIG. 2, in one embodiment, all or a portion of one or more of the example embodiments disclosed herein are encoded as a computer program and loaded onto and executed by server 240, server 245, storage devices 260(1)-(L), storage devices 270(1)-(N), storage devices 290(1)-(M), intelligent storage array 295, or any combination thereof. All or a portion of one or more of the example embodiments disclosed herein may also be encoded as a computer program, stored in server 240, run by server 245, and distributed to client systems 210, 220, and 230 over network 250. Accordingly, network architecture 200 may perform and/or be a means for performing, either alone or in combination with other elements, one or more of the operations disclosed herein. Network architecture 200 may also be used to perform and/or be a means for performing other operations and features set forth in the instant disclosure.

Accordingly, embodiments of the present disclosure illustrate file management in which accurate ownership of a file is determined based on access histories of the file and its related files. In some other embodiments according to the present disclosure provide methods and systems that determine accurate ownership of a file, properly implement archiving and deletion policies, and further properly implement and bill storage charge back services. As such, by analyzing the access history of a file, user activity associated with a file and its related files is discoverable, and can be used to determine accurate and current ownership of a particular file.

Embodiments of the present disclosure are described within the context of a data or file storage system. In some embodiments, the file storage system supports a large enterprise including individuals (e.g., company, corporation, etc.). As previously described, the storage system provides for storing and organizing computer files and their data, for example within the storage devices of FIG. 2. At a high level, the storage system organizes files into a database for storage, organization, manipulation and retrieval by one or more requesting computing systems.

Determining accurate file ownership is important for efficient implementation of file management policies within a file system or data infrastructure, including, but not limited to, making storage charge back decisions, archiving decisions, and remediation of security incidents. For instance, proper ownership of a file is helpful for implementing archival and deletion policies, especially as implemented on inactive files. Embodiments of the present invention are able to use past access patterns of a file and its related files, including sibling files, and parent files, to determine proper ownership of inactive files. Based on the permissions for archiving and deletion and other management policies as set by the proper owner, organizations are able to make proper decisions on whether to archive or delete inactive files. In that manner, storage space may be efficiently used, thereby providing a savings in storage costs.

Further, proper ownership enables the correct individual/entity to be charged for storage of a particular file or group of files. Internal charge back allows for a company to understand the true cost of storing, accessing and using data, whether that data is stored internally or by a third party. Many times, the creator and/or owner of a file is not the one actively using the file. Proper application of charge back requires proper identification of the owner of the file, especially when others are using the file. Embodiments of the present invention make use of the access history of a file and its related (e.g., sibling and parent) files in order to determine the proper owner of a file for charge back. In addition, through proper identification of the owner of a file, charge back at the department level (e.g., department associated with the owner) is properly applied. Through proper ownership of a file, charge back can be broken down to individual users or owners, individual directories and files, by type of file, etc.

Figure 3A:
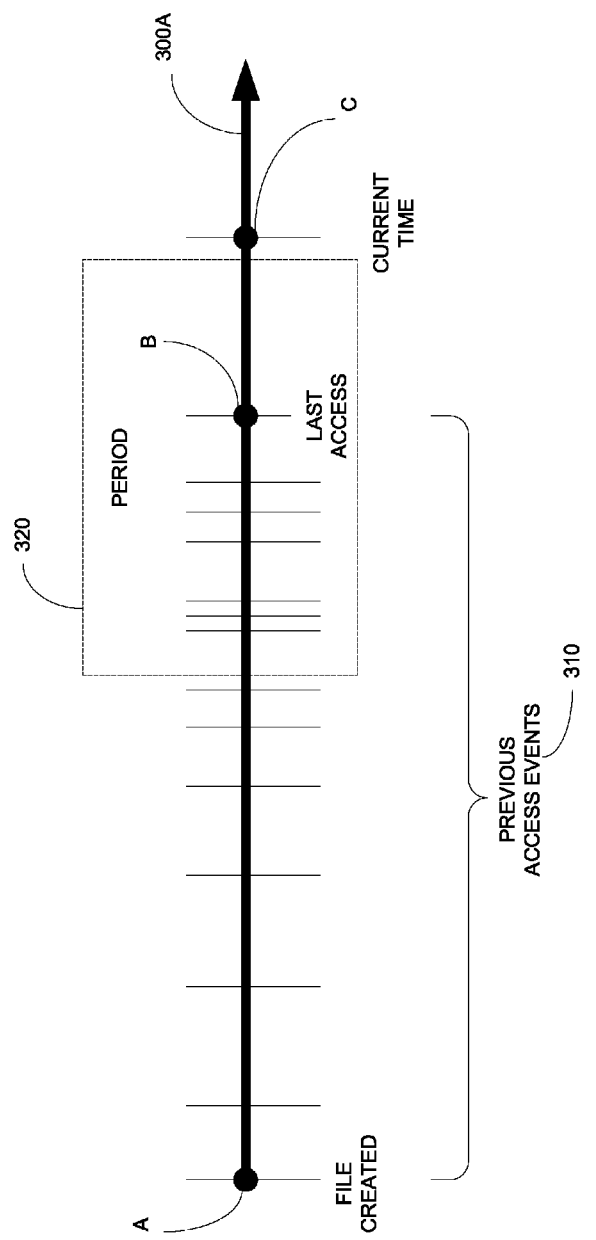
FIG. 3A is a timeline of access events for an active file in accordance with one embodiment of the present disclosure.

Throughout this disclosure ownership is determined for files in a data system. These files include active and inactive files. A file is active if one or more users have recently accessed and used the file. For instance, FIG. 3A is a timeline 300A illustrating access events for an active file in accordance with one embodiment of the present disclosure. As shown, timeline 300A begins at point A where the file was created by a "creator user." Point C marks an instance of time (e.g., current time) in which a file manager (e.g. file manager 400A of FIG. 4A) is determining the proper owner of the file.

Each access event for the file is marked on the timeline 300A. As shown in FIG. 3A, many access events (shown as previous access events 310) including the last access event have occurred between point A and point B, where the last access event was recorded. Period 320 is a variable time period (e.g., extending one or more days, weeks, months, years, etc.) and identifies a recent block of time adjacent to or near the current time at point C. Since accesses have occurred within period 320, the corresponding file is considered to be an active file. Other embodiments of the present disclosure identify an active file using different criteria, but all point to a file that has been active for a recent period of time.

As previously described, one or more users may access the file. The file may be associated with a project supported by multiple users, all of which can access the file. In addition, the creator user may no longer be working on the file, as the creator user may have been assigned to another project or has left the company. In that case, the creator user may not be the proper owner; however, file management system and methods of embodiments of the present disclosure are able to identify the proper owner such that data management polices associated with the file are correctly enforced.

Figure 3B:
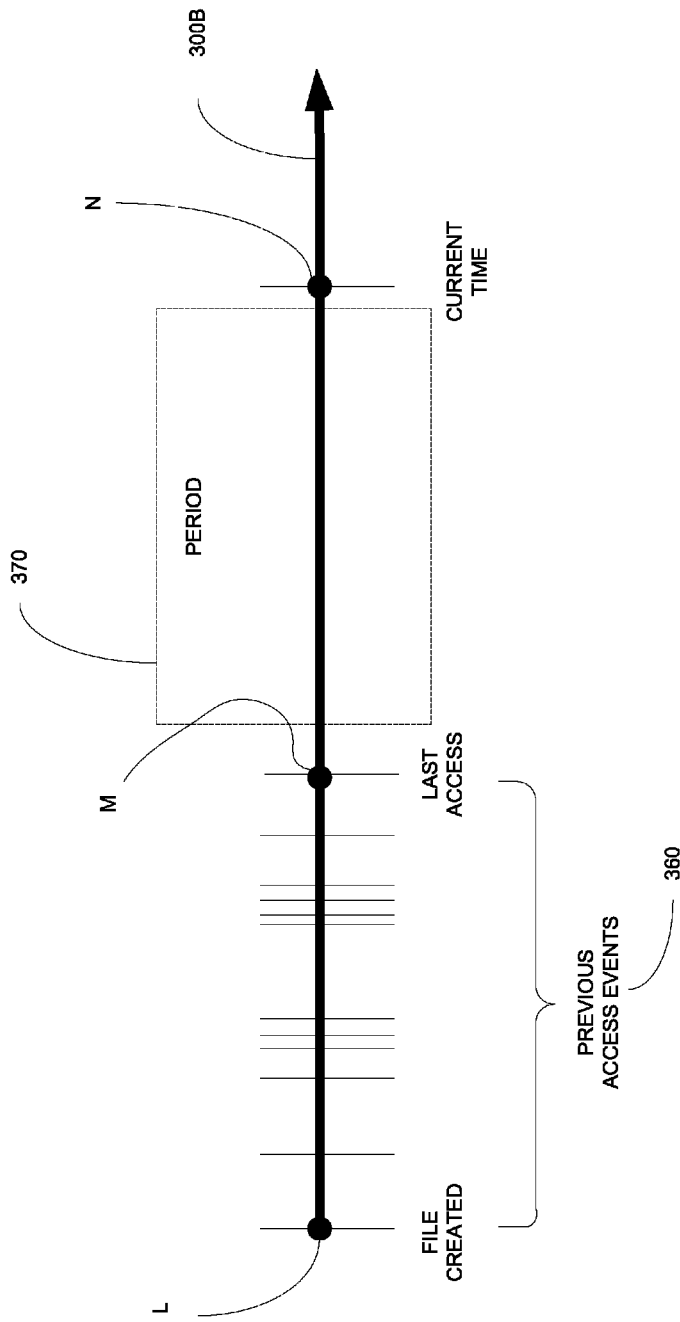
FIG. 3B is a timeline of access events for an inactive file in accordance with one embodiment of the present disclosure.

FIG. 3B is a timeline 300B illustrating access events for an inactive file in accordance with one embodiment of the present disclosure. As shown timeline 300B begins at point L where the file was created by a "creator user." Point N marks an instance of time (e.g., current time) in which a file manager (e.g., file manager 400B of FIG. 4B) is determining the proper owner of the file.

Each access event for the file is marked on the timeline 300B. As shown in FIG. 3B, many access events (shown as previous access events 360) including the last access event have occurred between point L and point M, where the last access event was recorded. Period 370 is a variable time period (e.g., extending one or more days, weeks, months, years, etc.) and identifies a recent block of time adjacent to or near the current time at point C. Since accesses have not occurred recently within period 370, the corresponding file is considered to be an inactive file. Other embodiments of the present disclosure identify an inactive file using different criteria, but all point to a file that has been inactive for a period of time.

Figure 4A:
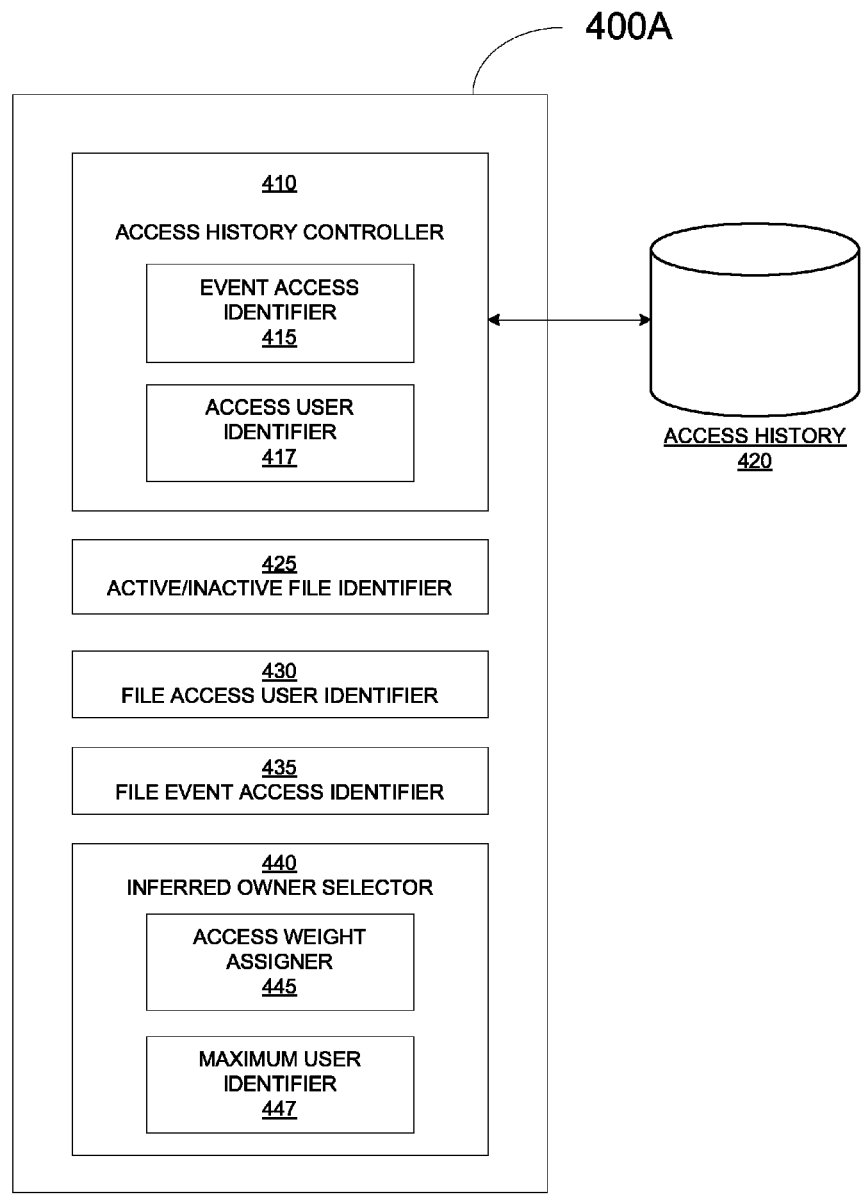
FIG. 4A is a block diagram of a file manager capable of determining accurate ownership of an active file in a data system using access history and access patterns for the file in accordance with one embodiment of the present disclosure.
Figure 4B:
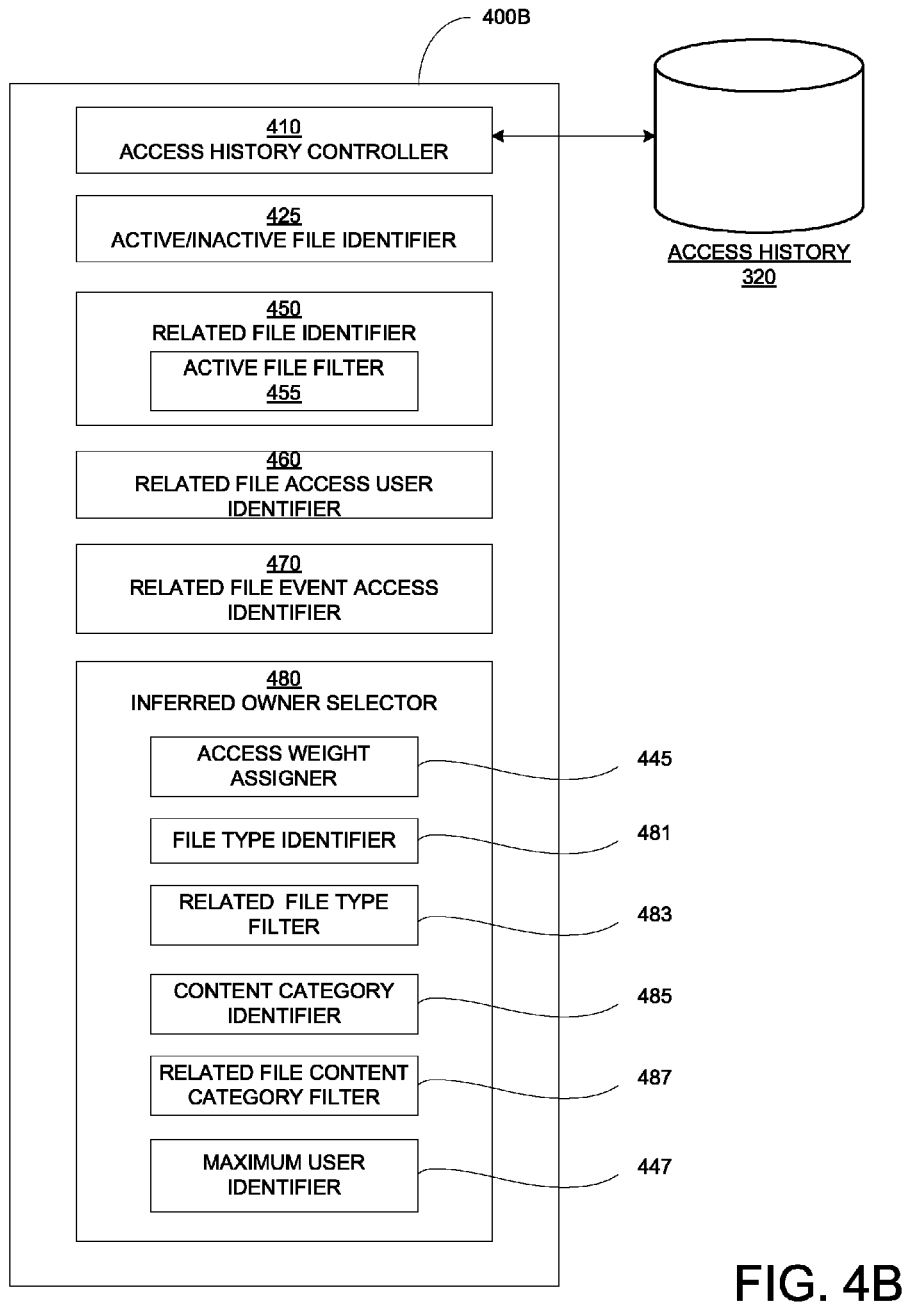
FIG. 4B is a block diagram of a file manager capable of determining accurate ownership of an inactive file in a data system using access history and access patterns for the file and its related (e.g., sibling/parent) files in accordance with one embodiment of the present disclosure.

FIGS. 4A and 4B illustrate systems for implementing file management. The systems are configured to execute computer readable instructions to determine file ownership of active and inactive files. The systems in FIGS. 4A and 4B are configured to work independently or in combination, and are capable of determining file ownership of files distributed throughout a data storage system for purposes of implementing data management policies, such as controlling access to files, archiving and deleting active and inactive files, and implementing proper charge back.

Turning now to FIG. 4A, a block diagram is shown of a file manager 400A capable of determining accurate ownership of a file in a data system. In particular, file manager 400A is capable of inferring ownership of an active file using access history and file access patterns of the active file in accordance with one embodiment of the present disclosure.

The file manager 400A includes an access history controller 410 that manages access to and storing of access events for one or more files in a data storage system within the access history 420. For instance, each file in the storage system is associated with a log, or similar record, stored in the access history that provides information tracking accesses of the file. Access information that is stored in the log includes, for example, which user accesses the file, and the type of file access. In addition, controller 410 provides access to the logs in the access history 420. In that manner, the file manager 400A is able to obtain file access information to determine file ownership of a particular active file.

In particular, access user identifier 417 monitors accesses to a file and identifies the one or more users accessing the file. That user access information is then stored within the corresponding access logs in the access history 420. Also, event access identifier 415 monitors accesses of a file and identifies the type of access event requested and performed by the corresponding user. For instance, types of accesses include, but are not limited to, read events, write events, delete file events, rename file events, open events, close events, unlink events, copy events, create events, configuration change events, etc.

File manager 400A also includes an active/inactive file identifier 425. When determining file ownership, a distinction is made between active files and inactive files. Active/inactive file identifier 425 examines the file accesses to a particular file, and determines whether the file is an active file or an inactive file. For instance, consistent with FIGS. 3A and 3B, identifier 425 determines a file is an active file when there is one or more recent accesses to the file. On the other hand, identifier 425 determines a file is an inactive file when there have not been any recent accesses to the file.

File manager 400A also includes a file access user identifier 430. File manager 400A has identified a specific file as an active file, and is configured to determine an owner of the file. For active files, in one embodiment, the most active user is inferred as being the owner of the file. As such, file access user identifier 430 is able to identify one or more users who have accessed a file over a defined period (e.g., 1-6 months). In one embodiment, the period covers a recent period. In addition, for each access event, event access identifier 435 identifies the type of access event (e.g., reads, writes, etc.) requested by a corresponding user.

The inferred owner selector 440 is configured to determine which user is logically the correct owner for purposes of implementation of data management policies, such as, those decisions made by an owner involving issues of archival, storage charge back, security remediation, deletion, etc. In particular, inferred owner selector 440 monitors all accesses to a file, and analyzes access patterns to determine the file owner. For instance, maximum user identifier 447 determines which user has the most accesses on the file within a period and labels that user as the inferred and proper owner of the file. In one particular embodiment, the user with the most accesses is the inferred owner. In another specific embodiment, the user with the most read and write accesses is the inferred owner. In still another embodiment, the user with the most write accesses is the inferred owner. Of course, other combinations of types of accesses are used to identify the user with the most accesses.

In addition, the inferred owner selector 440 includes an access weight assigner 445. Instead of equally weighting accesses to an active file used in determining ownership, types of accesses are prioritized, such that certain types of accesses exhibit more of an ownership role by the corresponding user. As such, a first type of access is given more weight over a second type of access. For instance, in one embodiment write accesses are given more weight than read accesses. That is, a user writing to a file exhibits more of an ownership role over a file over a user who is reading the file. As an example, one write access may be equal to 20 read accesses. In still another embodiment, time of access is weighted. For instance, more recent accesses are given more weight over older accesses.

FIG. 4B is a block diagram of a file manager capable of determining accurate ownership of an inactive file in a data system using access history and access patterns for the file and its related (e.g., sibling and/or parent) files in accordance with one embodiment of the present disclosure. As previously described, inactive files have had no activity in its recent history. In embodiments, the owner of an inactive file is determined based on sibling/parent file access patterns, as will be fully described below.

The file manager 400B includes an access history controller 410 that manages access to and storing of access events for one or more files in a data storage system within the access history 420. Controller 410 serves the same function in both file managers 400A and 400B. As such, controller 410 is able to obtain file access information for a file and its related (e.g., sibling and parent) files within access history 420 to determine file ownership of a particular inactive file.

In addition, file manager 400B includes an active/inactive file identifier 425, which serves the same function in both file manager 400A and 400B to determine whether a file is active or inactive. For instance, consistent with FIG. 3B, identifier 425 determines a file is inactive when there have been no recent accesses to the file.

Figure 7:
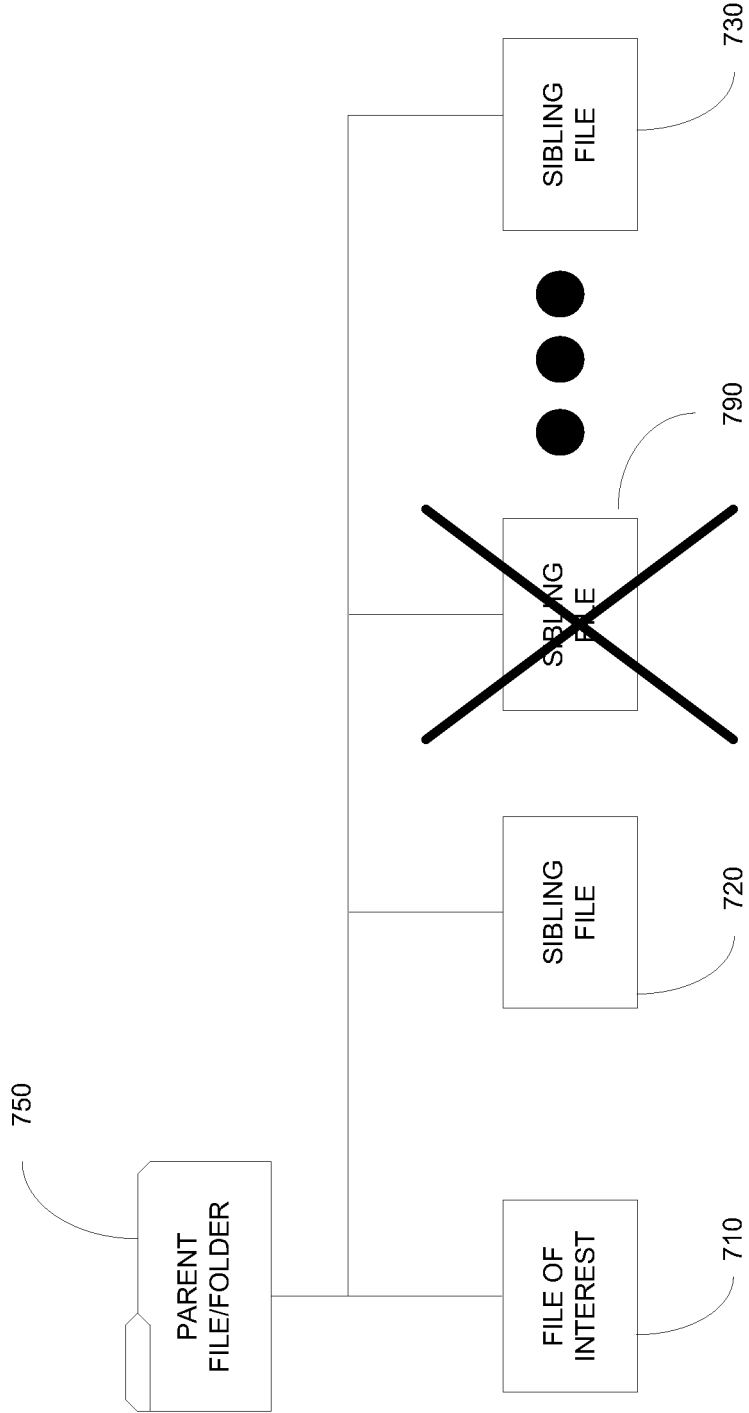
FIG. 7 is an illustration of the relationship between a file and its sibling files in accordance with one embodiment of the present disclosure.

File manager 400B also includes a related file identifier 450, which able to identify related files associated with a particular file. In particular, identifier 450 is able to identify all sibling and parent files to the inactive file of interest. FIG. 7 is a diagram illustrating the relationship between a file (e.g., inactive file) and its sibling files in accordance with one embodiment of the present disclosure in one embodiment. The file structure in FIG. 7 is intended to generally represent a file and its basic relationship to other files in a data system. While the file structure 700 shown in FIG. 7 is hierarchical, other formats are envisioned and supported in embodiments of the present disclosure. That is, parent and sibling files are related to a particular file. In particular, a parent file 750 is included within a file structure 700, and helps to organize files within the file system. Parent file may comprises a file, directory, folder, etc. Parent file 750 may include children files and/or other directories, subdirectories, folders, etc. As shown, parent file 750 includes the file of interest 710. In addition, one or more sibling files 720, 730, 790 to the file of interest 710 are also shown. In one embodiment, a sibling file is a file that is present in the same file, directory, or folder 750 that also contains the file of interest 710.

Returning back to FIG. 4B, related file identifier 450 identifies related files and also includes an active file filter 455 that identifies which of the related files are active files. The operations performed by filter 455 may also be performed by the active/inactive file identifier 425 in one embodiment. For instance, as shown in FIG. 7, sibling files 720 and 730 are active files, while sibling file 790 is an inactive file. Access history from the sibling files and/or the parent file 750 is used to infer ownership of the file of interest 710, as will be fully described in relation to FIGS. 5, 6A and 6B.

File manager 400B also includes a related file access user identifier 460. File manager 400B has identified a specific file as an inactive file, and is configured to determine an owner of the file. For inactive files, access history for related files is used to infer ownership in the inactive file. For instance, the most active user of related files may be inferred as the owner of the inactive file, in one embodiment. As such, identifier 460 is able to identify the one or more users who have accessed the related (e.g., sibling and/or parent) files over a defined period (e.g., the most recent 1-6 months). In addition, for each access event for the sibling files, related file event access identifier 470 identifies the type of access event (e.g., reads, writes, etc.) requested by a corresponding user.

The inferred owner selector 480 is configured to determine which user is logically the correct owner of the inactive file for purposes of implementation of data management policies, such as, those decisions made by an owner involving issues of archival, storage charge back, security remediation, deletion, etc. In particular, inferred owner selector 480 analyzes access patterns to related (e.g., sibling and/or parent) files to determine the file owner of the inactive file.

Inferred owner selector 480 includes an access weight assigner 445, previously described in FIG. 4A. In particular, weight assigner 445 prioritizes accesses by type. For instance, a write access may be given more weight than a read access, when inferring ownership of a file.

Inferred owner selector 480 examines related files that have the same file type, or content, or user defined tags as that of the file of interest, in one embodiment. For instance, selector 480 includes a file type identifier 481 to identify file types for all related (e.g., sibling and/or parent) files. File types can be categorized by file extension, including, but not limited to text files, media files, office files, backup and archive file, email files, executables, ghost files, graphics files, internet files, etc. Sibling file type filter 483 filters sibling files that are of the same file type as that of the inactive file. In addition, selector 480 also includes a content grouping identifier. For each file type, the information contained therein may be further categorized by content. For instance, for text files, content categories may include, but not limited to, source code files, financial documents, human resources files, product documentation, etc. Related file content grouping filter 487 filters files that are of the same file type and content grouping as that of the inactive file.

Inferred owner selector 480 analyzes access patterns for the unfiltered or filtered related files (e.g., by file type or content grouping) to determine the owner of the inactive file. In particular, maximum user identifier 447 determines which user has the most accesses on the relevant related files within a period and labels that user as the inferred and proper owner of the file. Identifier 447 may take into account filtering by file type and/or content grouping. In one particular embodiment, the user with the most accesses of the relevant related (e.g., sibling and/or parent) files is the inferred owner. In another specific embodiment, the user with the most read and write accesses of the relevant related files is the inferred owner. In still another embodiment, the user with the most write accesses of the relevant related files is the inferred owner. Of course, other combinations of types of accesses are used to identify the user with the most accesses.

Figure 5:
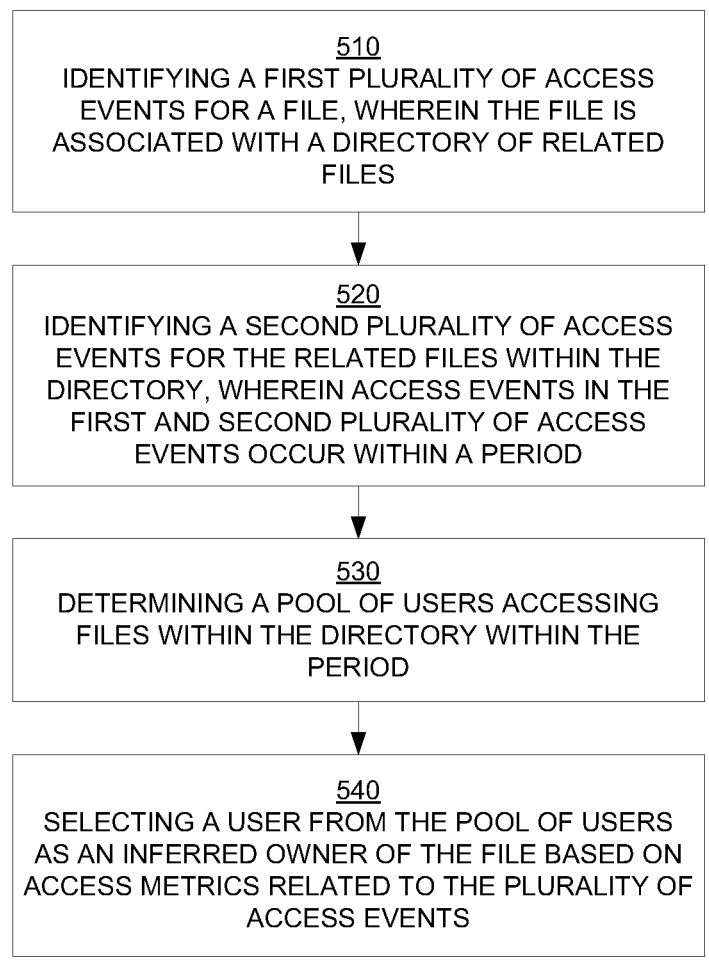
FIG. 5 is a flowchart of a computer-implemented process for determining accurate ownership of an inactive file in a data system using access history and access patterns for the file and its related files in accordance with one embodiment of the present disclosure.

FIG. 5 is a flowchart 500 of a computer-implemented process for file management according to an embodiment of the present disclosure. For instance, in one embodiment, the process outlined in flowchart 500 is implemented by file manager 400A and 400B of FIGS. 4A and 4B to determine ownership of active and inactive files based on access history and access patterns of the instant file, its sibling files, and/or its parent file.

In block 510, a first plurality of access events for a file is defined. For instance, access events include read events and write events, as well as other type of events concerning the file. In one embodiment, the access events are filtered, such that the events occur within a period of time. The period is variable (e.g., days, weeks, months, years), and is intended to provide sufficient information to accurately determine ownership of a file. In addition, the file is associated with one or more related files. For example, the file is related to sibling files within a directory of files. In addition, the file is related to one or more parent files in the directory. In one embodiment, the process outlined in block 510 is implemented by the access identifier 435 of file manager 400A. Access information from the events is used to identify the owner of the instant file.

In block 520, a second plurality of access events is identified for the related files. For instance, access events include read and write events, as well as other defined events. Access information from these related files are used to identify the owner of the instant file. In one embodiment, the access events identified occur within the period of time described above, such that access events for the first and second plurality of access events occur within the period. In one embodiment, the process outlined in block 520 is implemented by the related file event access identifier 470 of file manager 400B.

In block 530, a pool of users accessing files within the directory is determined. In particular, the files include the instant file, its one or more related files (e.g., sibling and/or parent files). The pool of users is associated with access events that occur within the defined period.

In block 540, an inferred owner is selected as one of the pool of users defined in block 530. In particular, the inferred owner is selected based on access metrics related to the plurality of access events that occur within the period. As such, access events for the file, and its related files are analyzed to determine the proper owner of the file. In one embodiment, a computer-implemented process is performed to determine the inferred owner of an active file based on access history and access patterns of that active file, and is more fully described in relation to FIG. 6A. In another embodiment, a computer-implemented process is performed to determine the inferred owner of an inactive file based on access history and access patterns of related files, and is more fully described in relation to FIG. 6B.

Figure 6A:
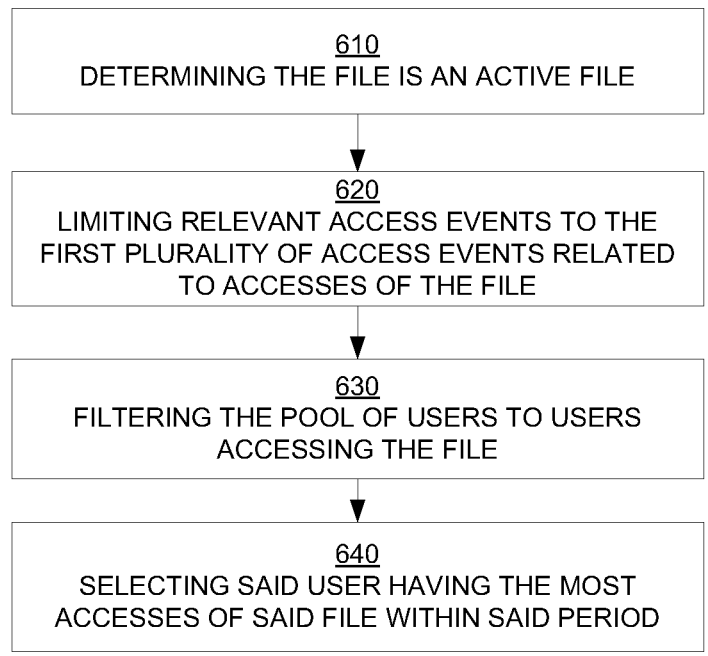
FIG. 6A is a flow chart of a computer-implemented process for determining an inferred owner of an active file in accordance with one embodiment of the present disclosure.

Turning now to FIG. 6A, a flow chart 600A is described illustrating a computer-implemented process for determining an inferred owner of an active file in accordance with one embodiment of the present disclosure. The operations performed in flow chart 600A is illustrative of the process outlined in block 540 of FIG. 5 to determine the inferred owner of a file of interest. In one embodiment, the operations performed in flow chart 600A is implemented by the inferred owner selector 440 of file manager 400A.

In block 610, the file of interest is determined to be an active file. That is, accesses have occurred within a defined and recent time period. Moreover, one or more users may be accessing the file for various purposes. Current users of the file may have more of an ownership role than older users, such as, the creator of the file.

In block 620, relevant access events are limited to the first plurality of access events related to accesses of the file of interest. Because the file is active, there is enough information contained within the access history for that file to determine ownership of the active file. Further, in block 630, the pool of users is filtered to include only those users who are accessing the particular file of interest.

In block 640, a user having the most recent accesses of the file is selected as the inferred owner. That is, the most active user of the file is the inferred owner. Specifically, the user having the most accesses within the first plurality of access events occurring during the period is selected as the inferred owner. In one embodiment, the access events are treated equally, for example read events carry as much weight as write events. In another embodiment, events are weighted to prioritize access events by type. For instance, write events are given more weight than read events. In one specific implementation, write events are the only access events considered, and as such are heavily weighted.

In another embodiment, the inferred owner is tagged from a list of top users. For instance, the pool of users that have accessed the file in the recent past is limited to a select list of top users (e.g., top 5 users). These users have the most accesses of the file within a defined period. The list of top users is then presented for selection of a user from the list as the inferred owner of the active file.

Figure 6B:
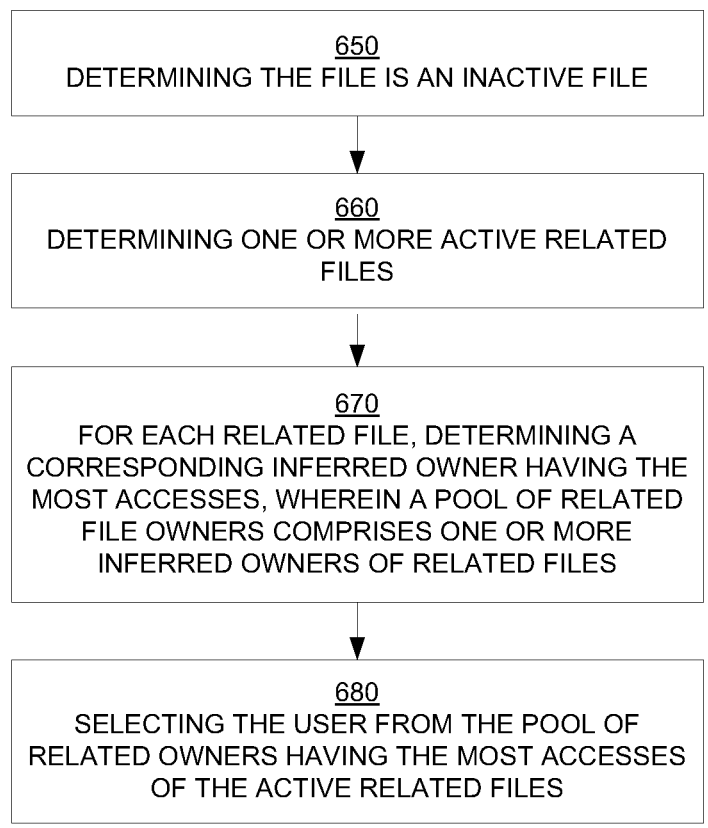
FIG. 6B is a flow chart of a computer-implemented process for determining an inferred owner of an inactive file in accordance with one embodiment of the present disclosure.

Turning now to FIG. 6B, a flow chart 600B is described illustrating a computer-implemented process for determining an inferred owner of an inactive file in accordance with one embodiment of the present disclosure. The operations performed in flow chart 600B is illustrative of the process outlined in block 540 of FIG. 5 to determine the inferred owner of a file of interest. In one embodiment, the operations performed in flow chart 600B is implemented by the inferred owner selector 480 and its components of file manager 400B.

In block 650, the file of interest is determined to be an inactive file. That is, no accesses have occurred within a defined and recent time period. Assuming file ownership of an inactive file belongs with the original creator of the file may be inaccurate in that the creator user may not be actively using the file any more (e.g., the creator user may have been assigned to another project, or has left the company). For inactive files, information from access events for the file may be stale since those events did not recently occur. Embodiments of the present disclosure examine access history, patterns of use, file type, and content grouping of related (e.g., sibling and/or parent) files to an inactive file to infer an owner of the inactive file.

In block 660, one or more related files associated with the inactive file are identified. Related files includes sibling and/or parent files, such as, those found in the directory of the inactive file. Since access information for the inactive file is unqualified for use in determining file ownership, access information for the related files is used in one embodiment to determine file ownership of the inactive file.

In block 670, for each related file, a corresponding inferred owner having the most accesses for the corresponding file is determined. For instance, an inferred owner is determined using the method outlined in FIG. 6A, in one embodiment. Moreover, a pool of related owners is created comprising one or more inferred owners of the related files.

In block 680, a user is selected from the pool of related owners having the most accesses of the related files. In essence, the most active user of the relevant related files is the inferred owner. In one embodiment, a straight count is performed from accesses of all related files. That is, the user having the most accesses within the second plurality of access events occurring during the period is selected as the inferred owner. In another embodiment, ownership of related files is abstracted at that level to determine the inferred owner, such that the user that has the majority of the inferred ownership of related files is the inferred owner. In one embodiment, the access events are treated equally, for example read events carry as much weight as write events. In another embodiment, events are weighted to prioritize access events by type. For instance, write events are given more weight than read events. In one specific implementation, write events are the only access events considered, and as such are heavily weighted.

In another embodiment, the inferred owner is tagged from a list of top users. For instance, the pool of users that have accessed related files in the recent past is limited to a select list of top users (e.g., top 5 users). These users have the most accesses of related file within a defined period. The list of top users is then presented for selection of a user from the list as the inferred owner of the inactive file.

If there are multiple related owners, further analysis of the access history for the related files is performed based on file type to select the inferred owner. In particular, a file type is determined for the inactive file. For instance, a file can be divided into different file types, such as that based on file extension. For example, a file type includes text files (e.g., .txt, .doc, etc.), media files (e.g., .jpg, .img, .mov, .mpeg, etc.) office files, backup and archive files, email files, executable files, ghost files, graphics files, internet files, etc. Then, related files are filtered by the file type of the inactive file. As such, the pool of related owners is now filtered to comprises one or more corresponding inferred owners of related files comprising the file type.

Thereafter, the user with the most accesses of related files with the same file type is considered to be the inferred owner of the inactive file. Consider a file .foo of which the owner is to be determined by embodiments of the present disclosure. The inferred owner can be considered as the user who owns the maximum number of related files that have the same file type, in one embodiment.

For example, FIGS. 8A and 8B are tables showing the classification of related files by file type. In particular, FIG. 8A is a table 800A that lists related files by type in column 805. In the present example, there are three file types: media (e.g., .mov, .avi, .mpeg, etc.); document/text (e.g., .txt, .doc, etc.); and images (.jpeg, .img, etc.). In table 800A, the maximum owner of media files in the related files is considered as the inferred owner, user "B", as shown in row 815; the maximum owner of document/text files in the related files is considered as the inferred owner, user "A", as shown in row 820; and the maximum owner of image files in the related files is considered as the inferred owner, user "B", as shown in row 830. Thus, as shown in FIG. 8B, column 855 in table 800B lists files by type, and column 860 lists the inferred owner by file type. As such, a document/text file, foo1.txt, has an inferred owner, user "A", as inferred by row 820 of table 800A and as shown in row 870 in table 800B. Also, an image file, foo2.jpg, has an inferred owner, user "B", as inferred by row 830 of table 800A and as shown in row 880 in table 800B. Further, a movie file, foo3.avi, has an inferred owner, user "B", as inferred by row 815 of table 800A and as shown in row 890 in table 800B.

In one embodiment, the related files are filtered to include only sibling files. In another embodiment, related files include only other files that are higher in the directory hierarchy, in order to limit the number of related files relevant for determining ownership.

In still another embodiment, the inference of ownership is determined based on access patterns of related files having the same file type and content grouping as the inactive file, in accordance with one embodiment of the present disclosure.

Once the file type is determined, ownership determination is based on a content analysis for that file type. That is, a content grouping for the inactive file is determined. For instance, the document/text file type is used for illustrative purposes, and is understood to be representative of various file types associated with one or more content categories. A document/text file can be categorized into different groupings, such as source code files, financial documents, human resource (HR) files containing personal information, product documentation, intellectual property (IP) files, etc. Then, related files are filtered by file type and content grouping. As such, the pool of related owners is now filtered to comprise one or more corresponding inferred owners of related files according to file type and content grouping. The user with the most accesses of related files with the same file type and file grouping (under that file type) is considered to be the inferred owner of the inactive file. Consider a file .foo of which the owner is to be determined. The inferred owner is considered as the user who owns the maximum number of related files that have the same file type and content grouping.

For example, FIGS. 9A and 9B are tables showing the classification of related files by file type and content grouping, and the inference of ownership of a file associated with a file type and content grouping by access patterns of sibling files having the same file type and content grouping in accordance with one embodiment of the present invention. In particular, FIG. 9A is a table 900A that lists related content groupings in column 905 for a particular file type, document/text. In the present example, there are three content groupings: financial documents, source code, and HR files. In table 900A, the maximum number of document/text files with a content grouping of financial documents in the related files is considered as the inferred owner, user "B", as shown in row 915; the maximum number of document/text files with a content grouping of source code in the related files is considered as the inferred owner, user "A", as shown in row 920; and the maximum number of document/text files with a content grouping of HR files in the related files is considered as the inferred owner, user "C", as shown in row 930. Thus, as shown in FIG. 9B, column 955 in table 900B lists files by type and content grouping. As such, a document/text file, with source file content grouping (e.g., foo.txt), has an inferred owner user "A", as inferred by row 920 of table 900A, and as shown in row 970 of table 900B.

In some embodiments, determining file ownership is performed through tagging. For example, files may be manually tagged according to their usage, cost code, departments that may be interested in the file, location, content etc. As such, an inactive file is classified according to its tag. Related files within a period are collected and filtered according to the tagging of the inactive file. As such, related files are filtered by tag, and wherein the pool of related owners comprises one or more corresponding inferred owners of related files comprising the tag. That is, for an inactive file of a particular tag, the user who has the most accesses of related files with the same tag is considered to be the inferred owner.

In particular, in accordance with one embodiment of the present disclosure ownership of a file is determined in a particular use case scenario. For instance, when determining the proper ownership of a file, usage of the "last known criteria" is analyzed to determine the owner. A file is generated which has a creator, such as, "domain Admin." Ownership of the file at creation is with "domain Admin"; however ownership may be transferred to another entity. For example, on the first day that the file was created, there was activity on the file by a user, named "Net Admin." That user is identified as an inferred owner of the file through embodiments of the present disclosure, and ownership has been transferred from the creator to the new owner. More specifically, the user named "Net Admin" is now identified as the "inferred owner" and is also the "last known owner," with proper identification made in corresponding fields. Following the creation of the file, there is a period of inactivity, such as, a period of five days of inactivity. At the end of the inactive period, it is necessary to determine the ownership of the file. For instance, a user is requesting access to the file, and the file management system must determine which access permissions are applicable. By accessing and analyzing the information in the access history of the file and its related files, it can be determined that there were five days of inactivity, and that the user, "Net Admin," shows up as the "inferred owner," using embodiments of the present disclosure. As a result, because there was a creation of a file and a long period of inactivity, the user identified as the "inferred owner" is most probably the proper owner of the file. If the "inferred owner" matches the "last known owner", then both align to show that the user, "Net Admin," is the proper owner. As a result, the proper owner is "Net Admin."

Figure 10:
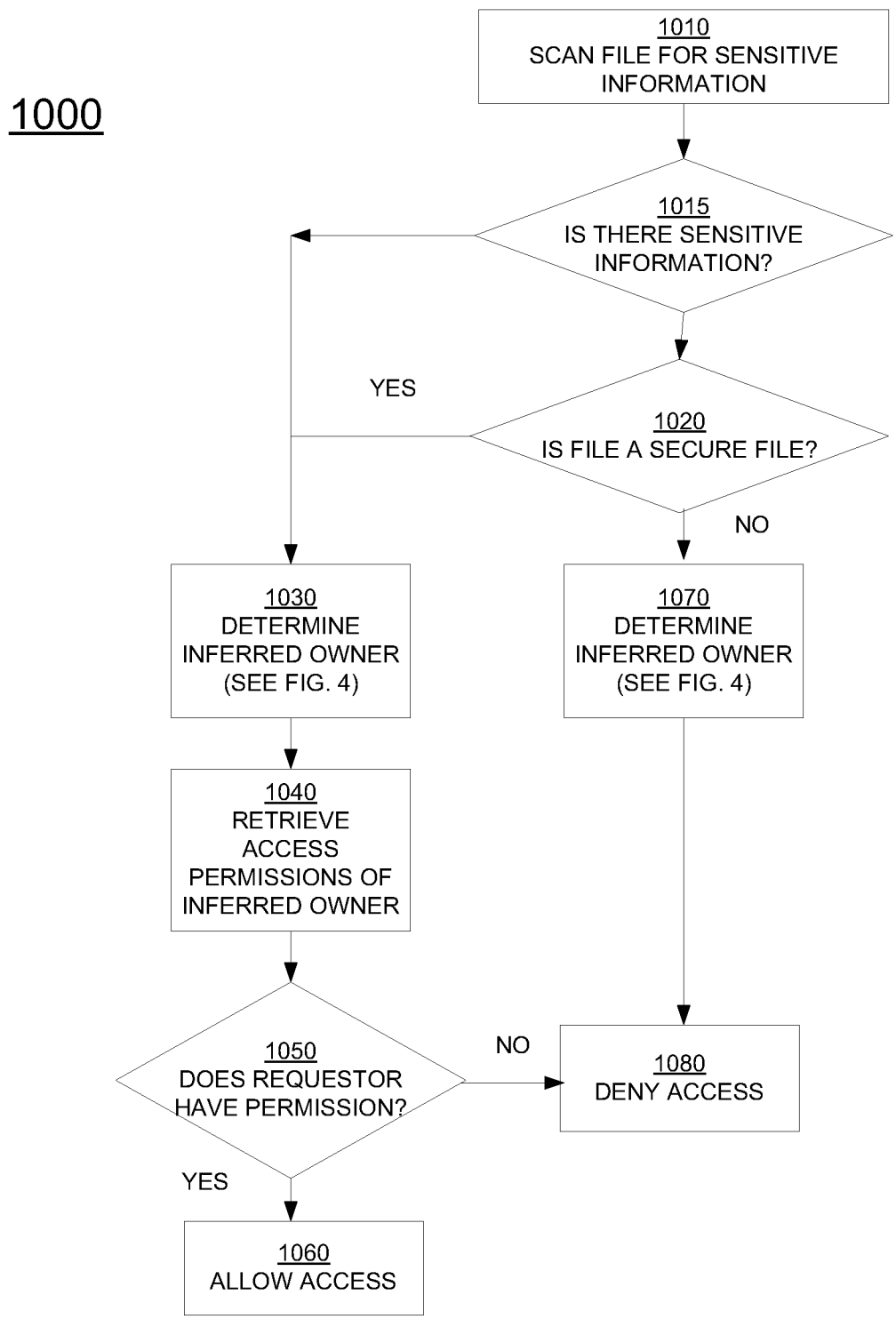
FIG. 10 is a flow chart of a computer-implemented process for providing file access according to access permissions of an inferred owner in accordance with one embodiment of the present disclosure.

FIG. 10 is a flow chart 1000 of a computer-implemented process for providing file access according to access permissions of an inferred owner in accordance with one embodiment of the present disclosure. In this manner security measures are implemented to ensure that proper users are able to access a file depending on access permissions associated with the inferred owner, and that information contained within the file is treated properly depending on its security level. For instance, the operations performed in 1000 may be implemented when a request to access a file is made.

In block 1010, a requested file is scanned for sensitive information. In particular, the file may be associated with a security level, such as a first level allowing sensitive information (e.g., sensitive personal information), and a second level that does not allow any sensitive information. The process outlined in flow chart 1000 allows for compliance with the security levels. At decision block 1015, it is determined if there is sensitive information within the requested file. If there is no sensitive information, then the process proceeds to block 1030, described below. On the other hand, if the requested file contains sensitive information, then the process proceeds to decision block 1020, where it is determined whether the file is a secure file configured to store sensitive information. If the file is configured to store sensitive information, then in block 1030, the inferred owner is determined using various embodiments of the present disclosure (e.g., methods 500, 600A, 600B and systems 400A, 400B of FIGS. 4A, 4B, 5, 6A, and 6B). The access permissions of the inferred owner is retrieved in block 1040. In decision block 1050, it is determined if the requesting user has permission to access the file based on the access permissions. If the requesting user has permission, then in block 1060, the requesting user is granted access. On the other hand, if the requesting user does not have permission, then in block 1080, the requesting user is denied access. Further, the process may notify the inferred owner of the denial of access. Returning to decision block 1020, if the secure file is not a secure file, then in block 1070, the inferred owner is determined using various embodiments of the present disclosure (e.g., methods 500, 600A, 600B and systems 400A, 400B of FIGS. 4A, 4B, 5, 6A, and 6B). Since the non-secure file is corrupted with sensitive information, the requesting user is denied access to the file in block 1080. Further, the process may notify the inferred owner of the non-secure file that includes sensitive information for remediation purposes.

Thus, according to embodiments of the present disclosure, accurate ownership of a file is determined in file management systems and methods based on access histories of the file and its related sibling and/or parent files.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered as examples because many other architectures can be implemented to achieve the same functionality.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various example methods described and/or illustrated herein may also omit one or more of the steps described or illustrated herein or include additional steps in addition to those disclosed.

While various embodiments have been described and/or illustrated herein in the context of fully functional computing systems, one or more of these example embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. These software modules may configure a computing system to perform one or more of the example embodiments disclosed herein. One or more of the software modules disclosed herein may be implemented in a cloud computing environment. Cloud computing environments may provide various services and applications via the Internet. These cloud-based services (e.g., software as a service, platform as a service, infrastructure as a service, etc.) may be accessible through a Web browser or other remote interface. Various functions described herein may be provided through a remote desktop environment or any other cloud-based computing environment.

The foregoing description, for purpose of explanation, has been described with reference to specific embodiments. However, the illustrative discussions above are not intended to be exhaustive or to limit the invention to the precise forms disclosed. Many modifications and variations are possible in view of the above teachings. The embodiments were chosen and described in order to best explain the principles of the invention and its practical applications, to thereby enable others skilled in the art to best utilize the invention and various embodiments with various modifications as may be suited to the particular use contemplated.

Embodiments according to the invention are thus described. While the present disclosure has been described in particular embodiments, it should be appreciated that the invention should not be construed as limited by such embodiments, but rather construed according to the below claims.

The invention claimed is:

1. A non-transitory computer-readable storage medium having stored thereon computer-executable instructions that, when executed by a computer system, cause the computer system to perform a method, the method comprising:

identifying a first plurality of access events previously performed on a file, wherein said file is associated with a directory of related files;

identifying a second plurality of access events previously performed on said related files within said directory, wherein access events in said first and second plurality of access events occur within a time period;

determining a pool of users that have accessed the file and the related files within said directory within said time period;

determining a type of each of the first plurality of access events and the second plurality of access events, the type of each of the first plurality of access events indicating an operation performed on the file and the type of each of the second plurality of access events indicating an operation performed on the related files; and selecting a user from said pool of users as an inferred owner of said file based on access metrics related to said first and second plurality of access events and the determined type of each of the first plurality of access events and the second plurality of access events.

2. The non-transitory computer-readable storage medium of claim 1, further comprising:

determining whether the file is active or inactive based on the first plurality of access events, wherein when it is determined that the file is active, selecting the user comprises:

limiting relevant access events to said first plurality of access events;

filtering said pool of users to users accessing said file; and selecting said user having the most accesses of said file within said time period.

3. The non-transitory computer-readable storage medium of claim 1, further comprising:

determining whether the file is active or inactive based on the first plurality of access events, wherein when it is determined that the file is inactive, selecting the user comprises:

determining one or more related files that are active;

for each related file, determining a corresponding inferred owner having the most accesses, wherein a pool of related owners comprises one or more inferred owners of related files; and selecting said user from said pool of related owners having the most accesses of said related files.

4. The non-transitory computer-readable storage medium of claim 3, said method further comprising:

determining a file type for said file; and filtering said related files by file type, wherein said pool of related owners comprises one or more corresponding inferred owners of related files comprising said file type.

5. The non-transitory computer-readable storage medium of claim 3, said method further comprising:

determining a file type for said file;

determining a content grouping for said file, wherein said content grouping is associated with said file type; and filtering said related files by said content grouping and said file type, wherein said pool of related owners comprises one or more corresponding inferred owners of related files comprising said file type and said content grouping.

6. The non-transitory computer-readable storage medium of claim 1, said method further comprising:

weighting a first type of access event more than a second type of access event in said access metrics.

7. The non-transitory computer-readable storage medium of claim 1, wherein the type of said first plurality of access events and the type of said second plurality of access events includes at least one of:
   a read event;
   a write event;
   a delete event;
   a rename event;
   a copy event;
   a create event; and
   a configuration change event.

8. The non-transitory computer-readable storage medium of claim 1, said method further comprising:
   selecting a list of top users from said pool of users; and
   presenting said list for selection of a user as said inferred owner.

9. A computer system comprising:
   a processor; and
   memory coupled to said processor and having stored therein instructions that, when executed by said computer system, causes said computer to execute a method, the method comprising:
      identifying a first plurality of access events previously performed on a file, wherein said file is associated with a directory of related files;
      identifying a second plurality of access events previously performed on said related files within said directory, wherein access events in said first and second plurality of access events occur within a time period;
      determining a pool of users that have accessed the file and the related files within said directory within said time period;
      determining a type of each of the first plurality of access events and the second plurality of access events, the type of each of the first plurality of access events indicating an operation performed on the file and the type of each of the second plurality of access events indicating an operation performed on the related files; and
      selecting a user from said pool of users as an inferred owner of said file based on access metrics related to said first and second plurality of access events and the determined type of each of the first plurality of access events and the second plurality of access events.

10. The computer system of claim 9, further comprising:
   determining whether the file is active or inactive based on the first plurality of access events, wherein when it is determined that the file is active, selecting the user comprises:
   limiting relevant access events to said first plurality of access events;
   filtering said pool of users to users accessing said file; and
   selecting said user having the most accesses of said file within said time period.

11. The computer system of claim 9, further comprising:
   determining whether the file is active or inactive based on the first plurality of access events, wherein when it is determined that the file is inactive, selecting the user comprises:
   determining one or more related files that are active;
   for each related file, determining a corresponding inferred owner having the most accesses, wherein a pool of related owners comprises one or more inferred owners of related files; and
   selecting said user from said pool of related owners having the most accesses of said related files.

12. The computer system of claim 11, said method further comprising:
   determining a file type for said file; and
   filtering said related files by said file type, wherein said pool of related owners comprises one or more corresponding inferred owners of related files comprising said file type.

13. The computer system of claim 11, said method further comprising:
   determining a file type for said file;
   determining a content grouping for said file, wherein said content grouping is associated with said file type; and
   filtering said related files by said content grouping and said file type, wherein said pool of related owners comprises one or more corresponding inferred owners of related files comprising said file type and said content grouping.

14. The computer system of claim 9, said method further comprising:
   weighting a first type of access event more than a second type of access event in said access metrics.

15. The computer system of claim 9, wherein the type of said first plurality of access events and the type of said second plurality of access events includes at least one of:
   a read event;
   a write event;
   a delete event;
   a rename event;
   a copy event;
   a create event; and
   a configuration change event.

16. The computer system of claim 9, said method further comprising:
   selecting a list of top users from said pool of users; and
   presenting said list for selection of a user as said inferred owner.

17. A computer implemented method for file management, comprising:
   identifying a first plurality of access events previously performed on a file, wherein said file is associated with a directory of related files;
   identifying a second plurality of access events previously performed on said related files within said directory, wherein access events in said first and second plurality of access events occur within a time period;
   determining a pool of users that have accessed the file and the related files within said directory within said time period;
   determining a type of each of the first plurality of access events and the second plurality of access events, the type of each of the first plurality of access events indicating an operation performed on the file and the type of each of the second plurality of access events indicating an operation performed on the related files; and
   selecting a user from said pool of users as an inferred owner of said file based on access metrics related to said first and second plurality of access events and the determined type of each of the first plurality of access events and the second plurality of access events.

18. The method of claim 17, further comprising:
   determining whether the file is active or inactive based on the first plurality of access events, wherein when it is determined that the file is active, selecting the user comprises:
   limiting relevant access events to said first plurality of access events;
   filtering said pool of users to users accessing said file; and selecting said user having the most accesses of said file within said time period.

19. The method of claim 17, further comprising:

determining whether the file is active or inactive based on the first plurality of access events, wherein when it is determined that the file is inactive, selecting the user comprises:

determining one or more related files that are active;

for each related file, determining a corresponding inferred owner having the most accesses, wherein a pool of related owners comprises one or more inferred owners of related files; and selecting said user from said pool of related owners having the most accesses of said related files.

20. The method of claim 17, further comprising:

determining a file type for said file; and filtering said related files by said file type, wherein said pool of related owners comprises one or more corresponding inferred owners of related files comprising said file type.

* * * * *